Figures 1, 2, 4:
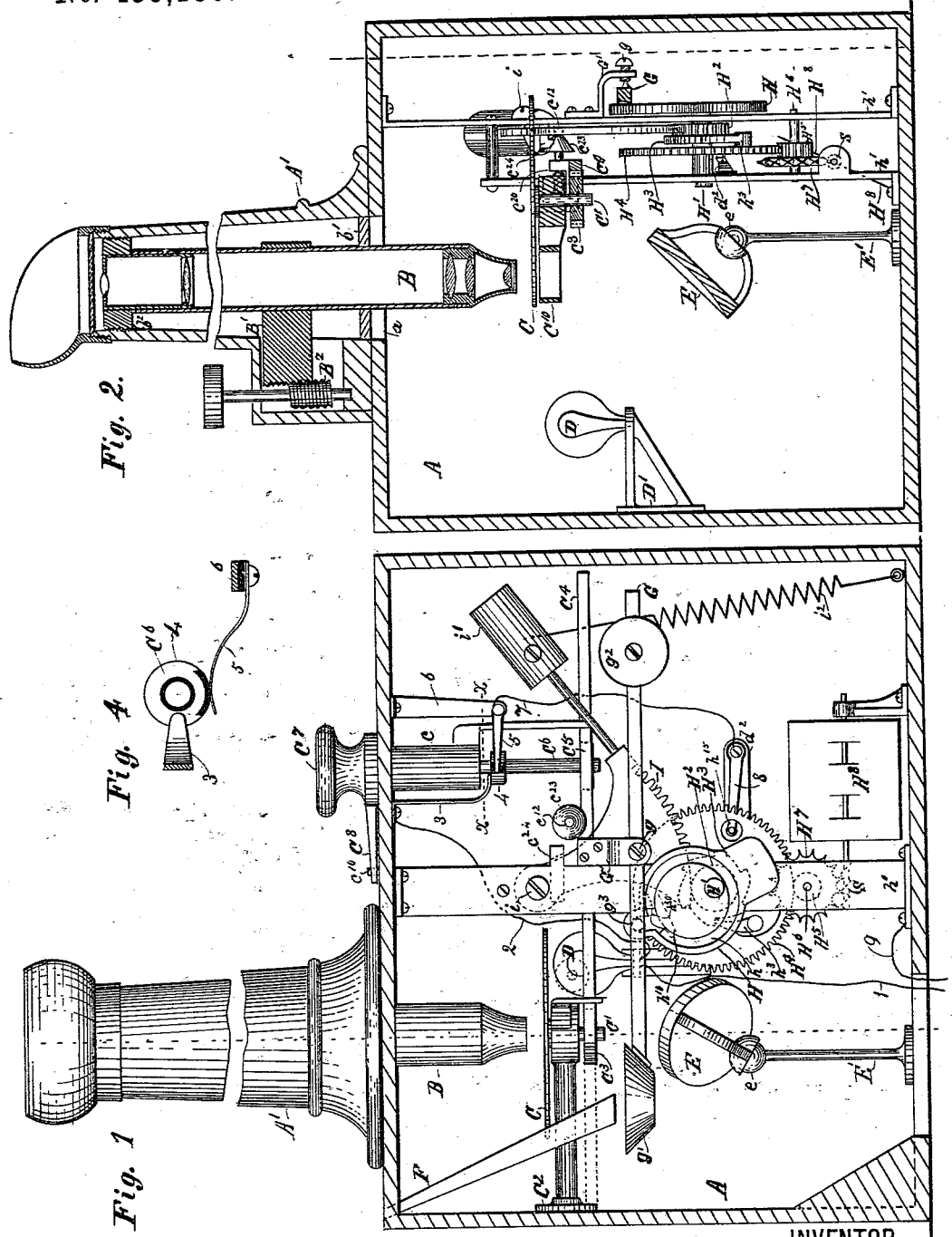

(No Model.) 2 Sheets—Sheet 1.

A. W. & A. H. ROOVERS.
COIN CONTROLLED MICROSCOPE.

No. 439,190. Patented Oct. 28, 1890.

WITNESSES:
INVENTOR
BY
THEIR ATTORNEYS

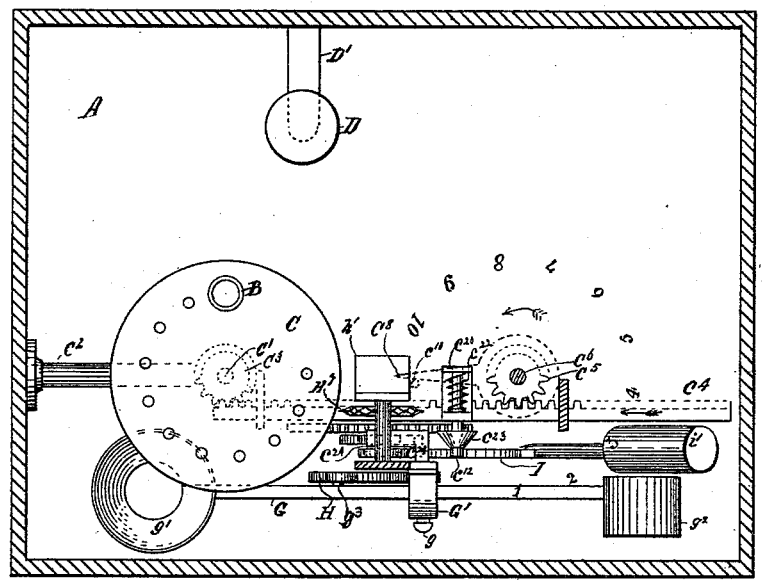

UNITED STATES PATENT OFFICE.

ALFRED W. ROOVERS AND ALEXANDER H. ROOVERS, OF BROOKLYN, NEW YORK.

COIN-CONTROLLED MICROSCOPE.

SPECIFICATION forming part of Letters Patent No. 439,190, dated October 28, 1890.

Application filed December 14, 1889. Serial No. 333,829. (No model.)

*To all whom it may concern:*

Be it known that we, ALFRED W. ROOVERS and ALEXANDER H. ROOVERS, both of Brooklyn, in Kings county, and the State of New York, have invented a certain new and useful Improvement in Coin-Controlled Microscopes, of which the following is a specification.

We will describe a coin-controlled microscope embodying our improvement, and then point out the novel features in the claims.

In the accompanying drawings, Figure 1 is a sectional elevation of a coin-controlled microscope embodying our improvement. Fig. 2 is a sectional elevation in a plane at right angles to the plane of Fig. 1. Fig. 3 is a horizontal section. Fig. 4 is a horizontal section at the line $x\ x$, Fig. 1. Fig. 5 is an elevation of certain parts of a machine of modified construction. Fig. 6 is a top view thereof.

Similar letters of reference designate corresponding parts in all the figures.

Referring first to Figs. 1, 2, and 3, A designates a box or case, which may be made of any suitable material. It is intended to be practically capable of excluding light. The top has a hole $a$, and from this extends a turret A'. In this turret a microscope B is arranged, and it extends through into the case A. This microscope may be made telescopic and the lower section made adjustable from outside the turret by means of securing to it within the turret an arm B', having one end provided with segments of a screw-thread and engaging with a screw or worm B², one of whose journals extends out through the turret, and is provided beyond the same with a hand-piece. The space between the interior of the turret and the microscope may be furnished with light-excluding packings $b'\ b^2$.

C designates an object plate or support. It is intended to be made of glass, and is shown as of circular form, and as supported by a shaft C', which is journaled concentrically to the axis of the microscope in a bracket C², which is affixed to one of the walls of the case A. It is intended that the objects to be viewed through the microscope shall be arranged in a circle upon the plate C, and that the axis of the shaft C' supporting said plate shall occupy such relation to the axis of the microscope that when the plate is rotated the objects mounted thereon will be successively brought in line with the axis of the microscope.

The shaft C' has affixed to it a pinion C³, and with this engages a rack C⁴, sliding in bearings provided in any suitable manner, as, for instance, in brackets secured to one of the walls of the case A. The rack C⁴ engages with a pinion C⁵, which is secured to an upright shaft C⁶. This shaft is supported in a bearing $c$, secured to the top of the case A, and it extends through the top of the case. Outside the case it is provided with a hand-piece C⁷. By rotating this hand-piece in either direction by hand-power the shaft C⁶ will serve, through the agency of the rack-bar C⁴, to rotate the object-plate C. The pinions C³ C⁵ being of the same size, the plate will have the same amount of rotation as is given to the hand-piece C⁷. The hand-piece C⁷ may advantageously be provided with a radially-extending index or pointer C⁸, and the top of the case A furnished with a series of figures corresponding to the number and positions of the objects upon the plate C. Then the hand-piece may be turned with reference to the series of figures on the top of the case, so as to adjust any particular object upon the plate C beneath the microscope. A pin $c^{10}$ inserted in the top of the case A, in such position as to be in the way of the index or pointer C⁸, will prevent the hand-piece from being turned more than one revolution in either direction.

D designates an electric lamp arranged within the case A and supported, as here shown, by a bracket D', secured to one of the walls of said case. It is intended to illumine the objects on the plate C, so that they may be viewed through the microscope. Under the present arrangement it illuminates the objects through the agency of a mirror E, which is shown as connected by a ball-and-socket joint $e$ with a standard E', fastened to the bottom of the case A. It may be found advantageous to use a screen or strainer C¹⁰ in line with the microscope and beneath the object-plate C, so as to prevent the mirror from shedding light upon the plate except where the object is arranged. We have shown the screen or strainer $C^{10}$ fastened to the bracket $C^2$.

In the present improvement we control the illumination of the object by the lamp D by means of a coin.

F designates a chute through which a coin is introduced. It opens at the top of the case A and extends down into the interior thereof.

G designates a lever fulcrumed at $g$ to a bracket $G'$, shown as secured to a plate extending between the top and bottom of the case A. At one end this lever has a coin-receptacle $g'$, which when the lever is in its normal position is located beneath the chute F. The other end is furnished with a weight $g^2$, which is sufficiently heavy to hold the lever in its normal position, except when a coin of the proper denomination enters its receptacle $g'$.

The lever G is provided with a pin $g^3$, which enters a groove $h$ in a disk H, secured to a shaft $H'$, shown as supported by plates $h'$, secured to the bottom of the case. The groove $h$, as shown, is of circular form, with one projection extending radially from its circle; but the circular part of this groove is eccentric to the shaft $H'$. If desired, the circular part of the groove may be omitted and the surface of the disk left plain excepting for the radial portion of the groove. When the circular part is omitted, there will, however, be a segmental-shaped piece like that which is bounded by the dotted line $h^{10}$ and the arc of the circle which the ends of this line meet. A spring $h^{30}$ extends outside the radial portion of the groove to prevent any jarring upon the machine from causing the lever G to swing and disengage its pin $g^3$ from said radial portion of the groove. The shaft $H'$ has loosely mounted upon it a pinion $H^2$, which is secured to a ratchet-wheel $H^3$, also loosely mounted on said shaft. A pawl $h^3$, pivoted to a wheel $H^4$, that is secured to the shaft $H'$, engages with the wheel, thereby connecting the pinion $H^2$ with the shaft $H'$ when it moves in one direction, but allowing it to run free of the shaft in the other direction. With the pinion $H^2$ engages a segment I. The gear-wheel $H^4$ engages with a pinion $H^5$, secured upon a shaft $H^6$, which has also secured to it a worm-wheel engaging with a worm or spiral S, secured to a shaft, which is provided with a fly $H^8$. The train of wheels is stopped by the pin $g^3$ of the lever entering the radial portion of the groove $h$ in the disk H. Whenever the lever G is swung downward by the dropping of a proper coin into its receptacle, the pin $g^3$ of said lever will descend through the radial portion of the groove $h$ until it strikes the wall, which is opposite said radial portion in the disk H. This is sufficient to unlock the train of wheels and allow of the rotation thereof; but this will not permit of a movement of the lever sufficient for discharging the coin from its receptacle. As the disk H rotates, it will, however, allow of the farther descent of the lever for the purpose of ejecting the coin.

The object of providing first for an unlocking movement and subsequently for a movement of the lever to effect the discharge of the coin is to preclude the lever from swinging down suddenly far enough to discharge the coin and quickly rebounding, so as to lock the train of wheels again before the same shall have been fairly started.

I designates a segment-lever fulcrumed by a pin or screw $i$ to a plate $h'$, secured to one side of the case A. The arc-shaped surface of this lever is provided with teeth which engage with the pinion $H^2$.

On the rack $C^4$ is a bracket $c^{20}$, having fitted within it a pin $c^{12}$, which is capable of moving lengthwise in the bracket, and as this bracket extends transversely to the rack said pin is free to move transversely to the length of the rack. A spring $c^{22}$ surrounds the pin within the bracket, bearing at one end against one end of the bracket and engaging at the other end with a hole in the pin, so as to move the pin toward the plane of the segment-lever. The pin has on that end which is the nearer to the segment-lever a cone $c^{23}$. When the rack is moved in the direction indicated by the arrow, Fig. 3, the cone will be carried against a projection $c^{24}$, supported by one of the plates $h$, and it and the pin $c^{12}$ will be forced rearwardly out of the plane of the segment-lever I and will be held rearward of the plane of said segment-lever during the further movement of the rack in the direction of the arrow until the cone shall have passed beyond the projection $c^{24}$. As soon as the cone shall have been carried beyond the projection $c^{24}$, the spring will force the pin $c^{12}$ forward and project the end thereof in front of the segment-lever. We mean across that side which is the nearer to the plate C. The reverse movement of the rack will, through the medium of the pin $c^{12}$, swing the segment-lever I rearward, or, in other words, farther from the plate C, until the pin $c^{12}$ shall have been carried far enough for its cone $c^{23}$ to act upon the projection $c^{24}$, whereupon said pin will be pulled backward beyond the plane of the segment-lever and will be free to move beyond the segment-lever to the rear or other side thereof. As the segment-lever I moves backward, the teeth of the ratchet-wheel $H^3$ play past the pawl and do not impart movement to the other wheels. The weight $i'$ will produce a reverse movement of the segment-lever and operate the train of wheels whenever a coin of the proper denomination shall have been dropped through the chute, and effect the release of the train of wheels. We have shown a spring $i^2$ connected with the lever I, which may act in conjunction with the weight, or the weight or spring may be omitted. It is intended that the shaft shall always be turned in the direction of the arrow, Fig. 3, until it comes in contact with the pin $c^{10}$, to insure the proper winding of the mechanism, or, in other words, the proper adjustment of the segment-lever I for operating the train of wheels.

We will now describe the circuit of the electric lamp D and the manner in which the same is affected by the movement of the train of wheels, premising that the train of wheels and their supports are made of metal.

1 is a wire leading from one pole or electrode of an electric battery and extending to one of the electrodes of the lamp D. The wire 2 extends from the other electrode of the lamp to a metallic spring-finger 3, which is shown as attached to the top of the case A and impinging at one end against a metal wheel or disk 4, affixed to the shaft $C^6$, and having in its periphery a block of insulating material. (Indicated by a solid black mark.) This wheel or disk is insulated from the shaft, as may be seen from the heavy black circle in Fig. 4.

5 is a metallic spring-finger which bears against the wheel or disk 4 and is connected to a bracket 6, that is fastened to the top of the case A. A wire 7 extends from this spring-finger to a spring-finger 8, secured to a bracket $d^2$, but insulated therefrom. The bracket $d^2$ is fastened to one of the plates $h'$. The spring-finger 8 is adapted to contact with one side of the wheel $H^4$, and in the latter is a hole $h^{15}$, which is so located that when the wheel $H^4$ is at rest this hole will be opposite the end of the spring-finger 8 and the circuit will be broken.

The insulating-block in the periphery of the wheel or disk 4 is so located that it will be opposite the spring-finger 5 and will break the circuit when the index or pointer $C^8$ is in contact with the pin $c^{10}$. When the shaft $C^6$ is rotated sufficiently to bring the first object into view, the insulating-block, which is in the periphery of said wheel or disk 4, will be moved beyond the spring-finger 5 and the circuit will be established between the wheel or disk 4 and spring-finger 5, and as soon as the wheel $H^4$ begins to rotate the circuit will be established between it and the spring-finger 8. 9 is the other wire from the electric battery, and it connects with one of the plates $h'$.

In the construction illustrated by Figs. 5 and 6 the lamp may be kept alight continuously, a shutter J being employed to prevent the light from passing through the screen or strainer $C^{10}$, except after a coin of the proper denomination shall have been dropped in the machine and only while the train of wheels is running. This shutter J is affixed to an arm $j$, that is secured to the shaft $H'$. Normally the shutter is held immediately beneath the screen or strainer. Whenever the train of wheels starts, the shutter will be moved out of this position and will be kept out of position until the train of wheels stops.

It will be readily understood that in this example of the improvement, as well as in that first described, the light is turned on and off from the object to be viewed through the microscope.

What we claim as our invention, and desire to secure by Letters Patent, is—

1. The combination, with a microscope, of a box or case, an object-support arranged within the box or case, a lamp for illuminating the objects, a device for turning the light onto an object to be viewed through the microscope, and a movable coin-receptacle controlling the operation of this device, substantially as specified.

2. The combination, with a microscope, of a box or case, an object-support arranged within the box or case and movable therein, a lamp for illuminating the objects, a device for turning the light onto an object to be viewed through the microscope, and a movable coin-receptacle controlling the operation of this device, substantially as specified.

3. The combination, with a microscope, of a box or case, an object-support arranged within the box or case, an electric lamp for illuminating the objects, a rotary wheel in the electric circuit of the lamp, an arm also in the circuit of the lamp coacting with said wheel, and a movable coin-receptacle controlling the operation of the wheel, substantially as specified.

4. The combination, with a microscope, of a box or case, an object-support arranged within the box or case, a motor for moving the object-support, a hand-piece for storing up power in the motor, an electric lamp for illuminating the objects to be viewed, an electric circuit extended to a part moved by the hand-piece and having an interruption in its surface, and an arm extending to the part last named and also in the electric circuit, whereby while the hand-piece is moved to store up power in the motor the lamp will not be lighted, substantially as specified.

5. The combination, in a coin-controlled machine, of a shaft $C^6$, a rack-bar operated by said shaft, and a segment-lever operated in one direction by said rack-bar, substantially as specified.

6. The combination, in a coin-controlled machine, of a shaft $C^6$, having a hand-piece $C^7$, and an index or pointer $C^8$, a rack-bar operated by said shaft, and a segment-lever operated by the rack-bar, substantially as specified.

7. In a coin-controlled machine, the combination of the rotary platform or support C, carried by a rotary shaft, a reciprocating bar imparting motion to said shaft, another shaft serving to reciprocate the bar, a hand-piece, an index or pointer on the last-mentioned shaft, and a segment-lever operated in one direction by the rack-bar, substantially as specified.

8. In a coin-controlled machine, the combination of a segment-lever, a weight or spring for actuating the same, a train of wheels driven by said segment-lever, and a reciprocating bar for moving said segment-lever in one direction, substantially as specified.

9. In a coin-controlled machine, the combination of a lever provided with a coin-receptacle, a rotary disk or wheel having a radial groove, and a projection or wall opposite said radial groove, substantially as specified.

ALFRED W. ROOVERS.
ALEXANDER H. ROOVERS.

Witnesses:
S. O. EDMONDS,
C. R. FERGUSON.